United States Patent
Bitar et al.

(10) Patent No.: US 7,433,781 B2
(45) Date of Patent: Oct. 7, 2008

(54) DEVICE FOR CARTOGRAPHICALLY REPRESENTING MINIMUM VERTICAL SPEEDS

(75) Inventors: Elias Bitar, Toulouse (FR); Nicolas Marty, Saint Sauveur (FR)

(73) Assignee: Thales, Neuilly-sur-Seine (FR)

( * ) Notice: Subject to any disclaimer, the term of this patent is extended or adjusted under 35 U.S.C. 154(b) by 0 days.

(21) Appl. No.: 11/719,032

(22) PCT Filed: Oct. 18, 2005

(86) PCT No.: PCT/EP2005/055329

§ 371 (c)(1),
(2), (4) Date: May 10, 2007

(87) PCT Pub. No.: WO2006/051031

PCT Pub. Date: May 18, 2006

(65) Prior Publication Data

US 2008/0004801 A1    Jan. 3, 2008

(30) Foreign Application Priority Data

Nov. 10, 2004    (FR) .................................. 04 11986

(51) Int. Cl.
*G08G 5/04*        (2006.01)
*G05D 1/06*        (2006.01)

(52) U.S. Cl. ............................. 701/208; 701/8; 340/977
(58) Field of Classification Search ...................... None
See application file for complete search history.

(56) References Cited

U.S. PATENT DOCUMENTS

| 5,936,552 A | 8/1999 | Wichgers et al. |
| 6,292,721 B1* | 9/2001 | Conner et al. .................. 701/9 |
| 2003/0107499 A1* | 6/2003 | Lepere et al. ............... 340/945 |
| 2004/0181318 A1 | 9/2004 | Redmond et al. |

FOREIGN PATENT DOCUMENTS

| FR | 2 689 231 A | 10/1993 |
| FR | 2 860 292 | 12/2005 |
| FR | 2 867 851 | 5/2006 |

OTHER PUBLICATIONS

Horng J-H et al: "Vehicle path planning by using adaptive constrained distance transformation" Pattern Recognition, Elsevier, Kidlington, GB, vol. 34, No. 6, Jun. 2002, pp. 1327-1337, XP004241798.

* cited by examiner

*Primary Examiner*—Michael J. Zanelli
(74) *Attorney, Agent, or Firm*—Lowe Hauptman Ham & Berner, LLP

(57) ABSTRACT

This device furnishes a map for assisting navigation at low-level altitude while representing the zone flown over with points shown in false colors and/or textures or symbols corresponding to the vertical speeds needed to fly over them.

8 Claims, 4 Drawing Sheets

DEVICE FOR CARTOGRAPHICALLY REPRESENTING MINIMUM VERTICAL SPEEDS

CROSS REFERENCE TO RELATED APPLICATIONS

The present Application is based on International Application No. PCT/EP2005/055329, filed on Oct. 18, 2005, which in turn corresponds to France Application No. 04 11986 filed on Nov. 10, 2004, and priority is hereby claimed under 35 USC §119 based on these applications. Each of these applications are hereby incorporated by reference in their entirety into the present application.

FIELD OF THE INVENTION

The present invention relates to a low-altitude navigation aid for aircraft. It more specifically concerns the navigation aid equipment on board an aircraft, furnishing navigation maps that are intended for display in the cockpit of an aircraft and flagging risks of collision with the ground.

BACKGROUND OF THE INVENTION

The aeronautical navigation maps that flag the risks of collision with the ground normally comprise a summary image of the region being flown over similar to a contour map in which the relief being flown over is shown by overlaid slices, assigned false colors and/or different textures and/or symbols giving them an appearance that is all the more eye-catching as the risk of collision increases. Some more detailed maps also show the background relief. Their generation implies an estimation of the risk of ground collision presented by each point of the relief of the represented region being flown over.

The estimation of the risk of ground collision presented by each point of the relief of the represented region being flown over can be carried out by a simple comparison of the elevations of the points of the region being flown over with a reference altitude which can be the current altitude of the aircraft or an altitude that can be predicted in the short or medium term for the aircraft. The displayed map then shows the relief by means of level sections staggered and referenced relative to that reference altitude.

The estimation of the risk of ground collision presented by each point of the represented region being flown over can also be carried out by looking to see if its overflight is within range of the aircraft taking into account an imposed vertical flight profile, that is, if there is a practicable path that avoids the prohibited zones, that observes the imposed vertical profile and a safe height relative to the relief being flown over, and that brings the aircraft from its current position to the point concerned. This search can be done implicitly by means of a method of estimating curvilinear distances for moving craft subject to static and dynamic route constraints such as that described by the Applicant in the French patent application filed on Sep. 26, 2003 under No. 0311320.

The currently known aeronautical navigation maps that flag the risks of ground collision have the drawback of assigning ground collision risk gradings to the zones of the region being flown over: high, medium, low, with no direct and intuitive relation for the pilot with a vertical speed set point.

SUMMARY OF THE INVENTION

An object of the present invention is to remedy this drawback by directly assimilating the risks of ground collision at a point of a region being flown over with the vertical speed needed to pass over while observing a safe overflight height.

The present invention is directed to a device for cartographically representing minimum vertical speeds for aircraft generating a navigation map from information in an elevation database of the terrain belonging to a particular maneuver region, said device comprising:

means for generating, in the maneuver region, multiple curvilinear distance maps listing the lengths of the shortest paths leading from the current position of the aircraft to the various points of the maneuver region while observing vertical flight profiles associated with different vertical speeds for the aircraft, means for combining, on one and the same final map, all the curvilinear distance maps obtained, selecting, for a point of the final map, the point geographically corresponding to it in the different curvilinear distance maps assigned the lowest curvilinear distance estimation, and means for displaying the selected points, showing, for each selected point, the vertical speed associated with the vertical flight profile observed by its original curvilinear distance map.

Advantageously, each curvilinear distance map is generated by means of a propagation distance transform constrained to observe a determined vertical flight profile associated with a given vertical speed value for the aircraft.

Advantageously, each curvilinear distance map is generated by means of a chamfer mask propagation distance transform, constrained to observe a determined vertical flight profile associated with a given vertical speed value for the aircraft.

The vertical flight profiles considered in generating the curvilinear distance maps have two parts: a first flight part with a fixed duration and a given vertical speed value followed by a second horizontal flight part.

Advantageously, the first part of a vertical flight profile considered on generating a curvilinear distance map corresponds to a determined absolute vertical speed value independent of the current vertical speed of the aircraft.

Advantageously, the first part of a vertical flight profile considered on generating a curvilinear distance map corresponds to a determined vertical speed value linked to the current vertical speed of the aircraft.

Advantageously, the vertical flight profiles considered on generating curvilinear distance maps are associated with vertical flight speeds separated by an increment of 500 ft/min.

Advantageously, the vertical flight profiles considered on generating curvilinear distance maps are associated with vertical flight speeds separated by an increment of 500 ft/min with an upper limit linked to the performance characteristics of the aircraft.

BRIEF DESCRIPTION OF THE DRAWINGS

Other advantages and features of the invention will become apparent from the description below of an embodiment given by way of example. This description will be given in light of the drawing in which.

a FIG. 1 represents an exemplary curvilinear distance map covering a maneuver zone and having the current position of the aircraft as the origin of the distance measurements, a FIG. 2 represents an exemplary chamfer mask that can be used by a propagation distance transform.

DETAILED DESCRIPTION OF THE PREFERRED EMBODIMENT

The navigation aid device that will be described generates a map of the region being flown over in the form of a summary image giving each point of the region being flown over an appearance dependent on the minimum vertical speed needed for the aircraft to manage to fly over it from its current position while observing a safe vertical margin over its route.

Map generation begins, before anything else, with the delimiting, on the surface of the earth, of an aircraft maneuver zone. The extent and the orientation of this maneuver zone are determined on the one hand from information concerning the instantaneous position of the aircraft and the modulus and the direction of its instantaneous speed vector given by the instruments on board and, on the other hand, from instructions given by the air crew.

The mapping of the zone of the earth that is selected involves estimations of the curvilinear distances separating the points of the selected zone from the current position of the aircraft made subject to different vertical speed assumptions. These curvilinear distance estimations are made by applying propagation distance transforms to the points of a working image taken from an elevation database of the terrain and of zones where overflight is barred by regulations, that is either on board or can be consulted from the aircraft. The image is constructed from a selection, in the database, of the points that belong to the maneuver zone retained, and the sequencing of the points selected according to a locating grid which is:

- a grid that is regular distance-wise, aligned on the meridians and parallels,
- a grid that is regular distance-wise, aligned on the heading of the aircraft,
- a grid that is regular distance-wise, aligned on the route of the aircraft,
- a grid that is regular angle-wise, aligned on the meridians and parallels,
- a grid that is regular angle-wise, aligned on the heading of the aircraft,
- a grid that is regular angle-wise, aligned on the route of the aircraft,
- a polar representation (radial) centered on the aircraft and its heading,
- a polar representation (radial) centered on the aircraft and its route.

In the description below, use is made of a locating grid that is regular distance-wise, aligned on the meridians and parallels, and defined by its north-west corner ($NW_{LAT}$ and $NW_{LON}$) and south-east corner ($SE_{LAT}$ and $SE_{LON}$), with, for angular resolution, $RES_{LAT}$ on the latitudes axis and $RES_{LON}$ on the longitudes axis.

In the figures, the proportions between the meshes of the locating grid and the surfaces of the different types of risk region are not respected so as to improve legibility.

Figure 1:
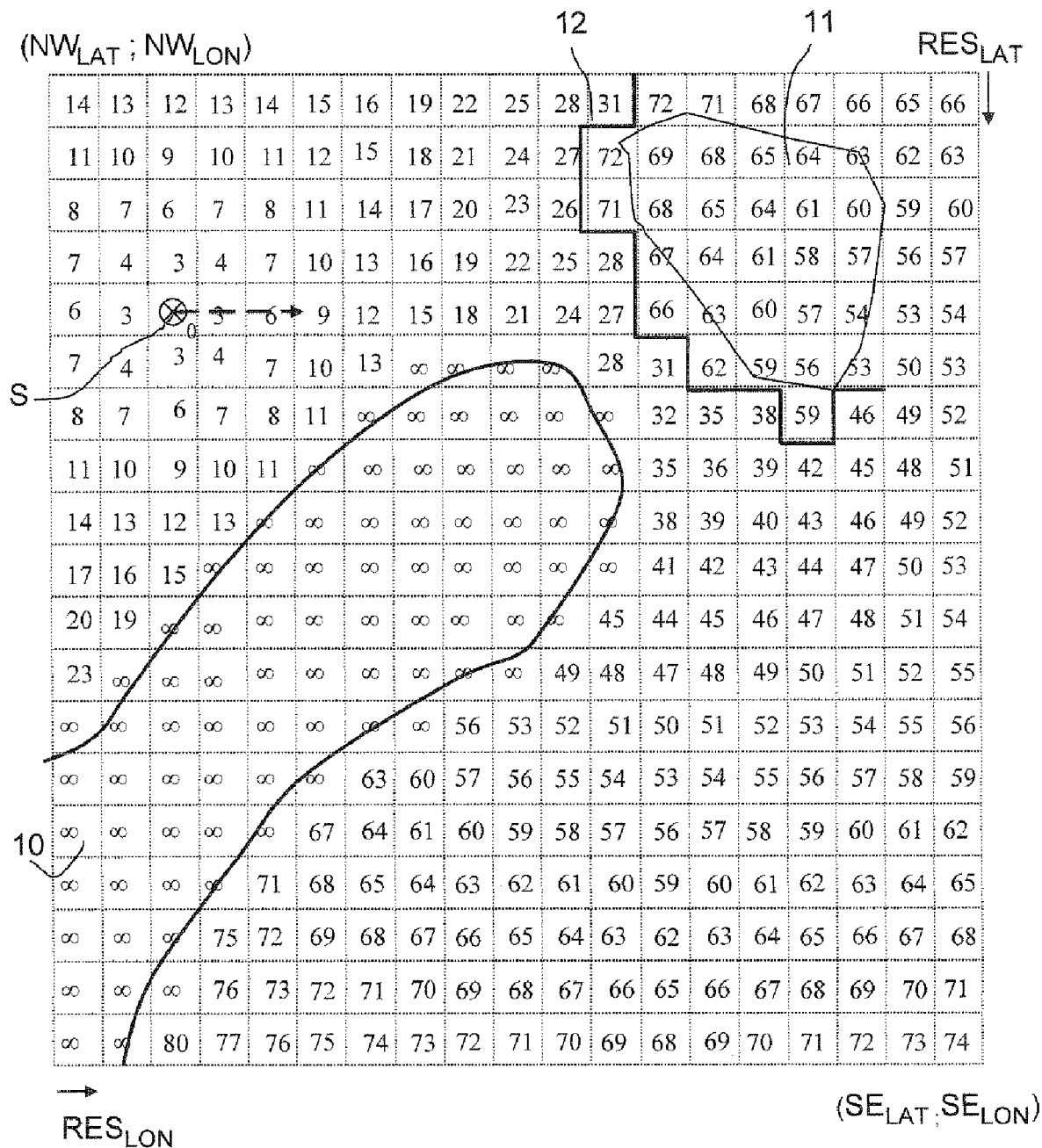

FIG. 1 gives an exemplary curvilinear distance map created to help in the navigation of an aircraft having a vertical flight profile imposed from a working image initially comprising a prohibited overflight zone 10 identified by a marking of the cells of the mesh of the locating grid wholly or partly belonging to it, taking an infinite value.

This curvilinear distance map can be created by means of a propagation distance transform or chamfer mask distance transform, as has been described by the applicant in the French patent application filed under No. 03 11320 on Sep. 26, 2003 and in the French patent application filed under No. 04 02870 on Mar. 19, 2004.

Briefly, chamfer mask distance transforms are techniques that initially emerged in image analysis for estimating distances between objects. Gunilla Borgefors describes examples of them in her article entitled "Distance Transformation in Digital Images", published in the review: Computer Vision, Graphics and Image Processing, Vol. 34 pp. 344-378 in February 1986.

The distance between two points of a zone is the minimum length of all the possible routes over the zone leaving from one of the points and arriving at the other. In an image made up of pixels distributed in a regular mesh of rows, columns and diagonals, a propagation distance transform estimates the distance of a so-called "target" pixel from a so-called "source" pixel, by progressively constructing, starting from the source pixel, the shortest possible path through the mesh of the pixels and culminating at the target pixel, and by using the distances found for the pixels of the image that have already been analyzed and a so-called chamfer mask array listing the values of the distances between a pixel and its near neighbors.

Figure 2:
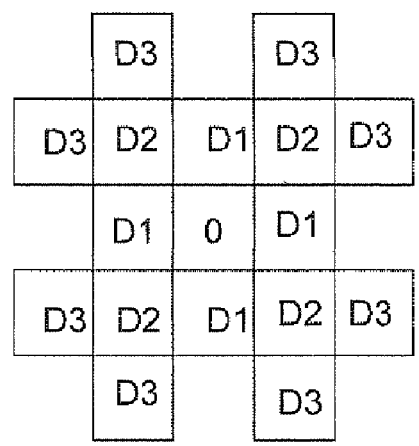

As shown in FIG. 2, a chamfer mask takes the form of an array with an arrangement of cells reproducing the pattern of a pixel surrounded by its near neighbors. At the center of the pattern, a cell assigned the value 0 identifies the pixel taken for the origin of the distances listed in the array. Around this central cell are clustered peripheral cells filled with non-zero proximity distance values and reproducing the layout of the pixels in the neighborhood of a pixel assumed to occupy the central cell. The proximity distance value given in a peripheral cell is that of the distance separating a pixel occupying the position of the peripheral cell concerned from a pixel occupying the position of the central cell. It will be noted that the proximity distance values are divided into concentric rings. A first ring of four cells corresponding to the four first-rank pixels, which are the nearest to the pixel of the central cell, either on the same row, or on the same column, are assigned a proximity distance value D1. A second ring of four cells corresponding to the four second-rank pixels, which are the pixels closest to the pixel of the central cell placed on the diagonals, are assigned a proximity distance value D2. A third ring of eight cells corresponding to the eight third-rank pixels, which are the nearest to the pixel of the central cell while remaining outside the row, the column and the diagonals occupied by the pixel of the central cell, are assigned a proximity distance value D3.

The chamfer mask can cover a more or less extensive neighborhood of the pixel of the central cell by listing the proximity distance values of more or less concentric rings of neighboring pixels. It can be reduced to the first two rings formed by the pixels in the neighborhood of a pixel occupying the central cell or be extended beyond the first three rings formed by the pixels in the neighborhood of the pixel of the central cell. It is usual to stop at the first three rings as for the chamfer mask shown in FIG. 3.

The proximity distance values D1, D2, D3 which correspond to Euclidian distances are expressed in a scale, the multiplication factor of which allows the use of integer numbers at the cost of a certain approximation. Thus, G. Borgefors adopts a scale corresponding to a multiplication factor of 3 or 5. In the case of a chamfer mask retaining the first two rings of proximity distance values, therefore measuring 3×3, G. Borgefors gives, for the first proximity distance D1 which corresponds to a stage on the y axis or on the x axis and also to the scale multiplication factor, the value 3 and, for the second proximity distance which corresponds to the root of the sum of the squares of the stages on the y axis and on the x axis $\sqrt{x^2+y^2}$, the value 4. In the case of a chamfer mask retaining the first three rings, therefore measuring 5×5, she gives the distance D1, which corresponds to the scale multiplication factor, the value 5, to the distance D2, the value 7 which is an approximation of $5\sqrt{2}$, and to the distance D3 the value 11 which is an approximation of $5\sqrt{5}$.

The shortest possible path going to a target pixel starting from a source pixel and following the mesh of the pixels is progressively constructed by a regular scanning of the pixels of the image by means of the chamfer mask.

Initially, the pixels of the image are assigned an infinite distance value, in fact a number that is high enough to exceed all the values of the distances that can be measured in the image, except for the source pixel or pixels which are assigned a zero distance value. Then, the initial distance values assigned to the target points are updated during the scanning of the image by the chamfer mask, an update consisting in replacing a distance value assigned to a target point with a new, lower value resulting from a distance estimation made on a new application of the chamfer mask to the target point concerned.

A distance estimation by applying the chamfer mask to a target pixel involves listing all the paths going from this target pixel to the source pixel and passing through a pixel in the neighborhood of the target pixel, the distance of which has already been estimated during the same scan, searching among the listed paths for the shortest path or paths and adopting the length of the shortest path or paths as distance estimation. This is done by placing the target pixel for which the distance is to be estimated in the central cell of the chamfer mask, by selecting the peripheral cells of the chamfer mask corresponding to pixels in the neighborhood, the distance of which has just been updated, by calculating the lengths of the shortest paths linking the target pixel to be updated to the source pixel passing through one of the selected neighboring pixels, by adding the distance value assigned to the neighboring pixel concerned and the proximity distance value given by the chamfer mask, and by adopting, for distance estimation, the minimum of the path length values obtained and of the old distance value assigned to the pixel during analysis.

At the level of a pixel being analyzed by the chamfer mask, the progressive search for the shortest possible paths starting from a source pixel and going to the various target pixels of the image gives rise to a propagation effect in the directions of the pixels that are the nearest neighbors of the pixel being analyzed and the distances of which are listed in the chamfer mask. In the case of a regular distribution of the pixels of the image, the directions of the nearest neighbors of a pixel that do not vary are considered as propagation axes of the chamfer mask distance transform.

The order of scanning of the pixels of the image influences the reliability of the distance estimations and their updates because the paths taken into account depend thereon. In fact, it is subject to a regularity constraint whereby if the pixels of the image are identified in lexicographic order (pixels arranged in a row-by-row ascending order starting from the top of the image and working towards the bottom of the image, and from left to right within a row), and if a pixel p has been analyzed before a pixel q then a pixel p+x must be analyzed before the pixel q+x. The lexicographic order, reverse lexicographic order (scanning of the pixels of the image row by row from bottom to top and, within a row, from right to left), transposed lexicographic order (scanning of the pixels of the image column by column from left to right and, within a column, from top to bottom) and reverse transposed lexicographic order (scanning of the pixels by columns from right to left and, within a column, from bottom to top) all satisfy this regularity condition and, more generally, all the scans in which the rows and columns are scanned from right to left or from left to right. G. Borgefors recommends a double scanning of the pixels of the image, one time in the lexicographic order and another time in the reverse lexicographic order.

The image can be analyzed by means of the chamfer mask according to a parallel method or a sequential method. For the parallel method, the distance propagations from all the points of the mask that are made to pass over all of the image in multiple scans are considered until there is no further change in the distance estimations. For the sequential method, the distance propagations are considered only from half of the points of the mask. The top half of the mask is made to pass over all the points of the image by a scan in the lexicographic order, then the bottom half of the mask is made to pass over all the points of the image in the reverse lexicographic order.

Figure 3A:
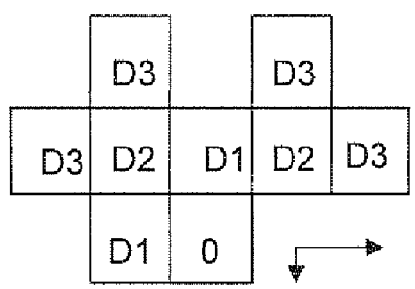
FIGS. 3a and 3b show the cells of the chamfer mask illustrated in FIG. 2, which are used in a scanning pass in lexicographic order and in reverse lexicographic order, a FIG. 4 shows the vertical flight profiles adopted as dynamic constraint for a propagation distance transform on generating a curvilinear distance map, a FIG. 5 shows a summary image generated, by an inventive navigation aid device, from curvilinear distance maps constrained by different vertical flight profiles taking into account various vertical speeds, a FIG. 6 shows, in vertical cross section, the combination of curvilinear distance maps contributing to the generation of the summary image of FIG. 5, and a FIG. 7 represents a diagram of an inventive navigation aid device.

FIG. 3a shows, in the case of the sequential method and of a scanning pass in the lexicographic order going from the top left corner to the bottom right corner of the image, the cells of the chamfer mask of FIG. 2 used to list the paths going from a target pixel placed on the central cell (cell indexed 0) to the source pixel, passing through a neighboring pixel, the distance of which has already been the subject of an estimation during the same scan. There are eight of these cells, arranged in the top left part of the chamfer mask. There are therefore eight paths listed for the search for the shortest whose length is taken for the distance estimation.

Figure 3B:
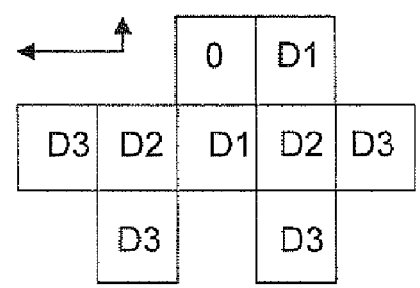

FIG. 3b shows, in the case of the sequential method and of a scanning pass in the reverse lexicographic order going from the bottom right corner to the top left corner of the image, the cells of the chamfer mask of FIG. 2 used to list the paths going from a target pixel placed on the central cell (cell indexed 0) to the source pixel, passing through a neighboring pixel, the distance of which has already been the subject of an estimation during the same scan. These cells are in addition to those of FIG. 4a. Once again, there are eight of them, but arranged in the bottom right part of the chamfer mask. There are therefore again eight paths listed for the search for the shortest whose length is taken for the distance estimation.

The propagation distance transform, the principle of which has just been briefly summarized, was originally designed for analyzing the positioning of objects in an image but it was soon to be applied to estimating distances on a relief map taken from an elevation database of the terrain with regular meshing of the surface of the earth. In practice, such a map does not explicitly have a metric since it is plotted based on the elevations of the mesh points of the elevation database of the terrain of the zone represented. In this context, the propagation distance transform is applied to an image, the pixels of which are the elements of the elevation database of the terrain belonging to the map, that is, elevation values associated with the geographic latitude and longitude coordinates of the nodes of the mesh where they have been measured, classified, as on the map, by latitude and by longitude, ascending or descending according to a two-dimensional array of latitude and longitude coordinates.

For a ground navigation of moving craft such as robots, the chamfer mask distance transform is used to estimate curvilinear distances taking account of zones that cannot be crossed because of their uneven configurations or because of a regulatory prohibition. For this, a prohibited zone attribute can be associated with the elements of the elevation database of the terrain shown in the map. When activated, it flags a zone that cannot be crossed or is prohibited and disables any updating, other than an initialization, of the distance estimation made by the chamfer mask distance transform.

In the case of an aircraft on which a vertical flight profile is imposed, the configuration of the uncrossable zones evolves as a function of the altitude resulting from following the vertical flight profile. When generating a curvilinear distance map covering the region being flown over, this is reflected by the fact that the propagation distance transform propagates over the points of the image made up of elements from the elevation database of the terrain, both the altitude that the aircraft would assume at this point after having traveled a joining path of minimum length observing its vertical flight profile, called propagated altitude, and a measurement of distance from the aircraft, called propagated distance, and by the fact that the propagated distance at a point is taken into account for a distance estimation only if the associated propagated altitude is greater than the elevation of the point concerned included in the database. Ultimately, the points belonging to zones that cannot be crossed with the vertical flight profile adopted have estimated curvilinear distances very much greater than their distances seen from the aircraft, which makes it possible to distinguish them quickly from the other points of the selected zone of the earth.

As can be seen in FIG. 1, the application, subject to dynamic constraint, of the chamfer mask distance transform has not made it possible to find an appropriate path joining the current position S of the aircraft to certain points of the region being flown over which have an infinite distance estimation, either because they belong to a zone 10 over which propagation has been prevented by the presence of a prohibited zone attribute flagging a regulatory prohibition, or because the propagation has failed in its search for paths that observe the imposed vertical flight profile. Over other points of a zone 11, the application, subject to static and dynamic constraints, of the chamfer mask distance transform has culminated in curvilinear distance estimations that are significantly greater than the Euclidian distances measured as straight lines showing that the curvilinear distances have been measured over avoidance paths. On the edge 12 of the zone 11 facing the current position S of the aircraft, major differences appear between the curvilinear distance estimations for neighboring points indicating the presence of a relief (cliff) that is dangerous because it is uncrossable by a direct path.

Figure 4:
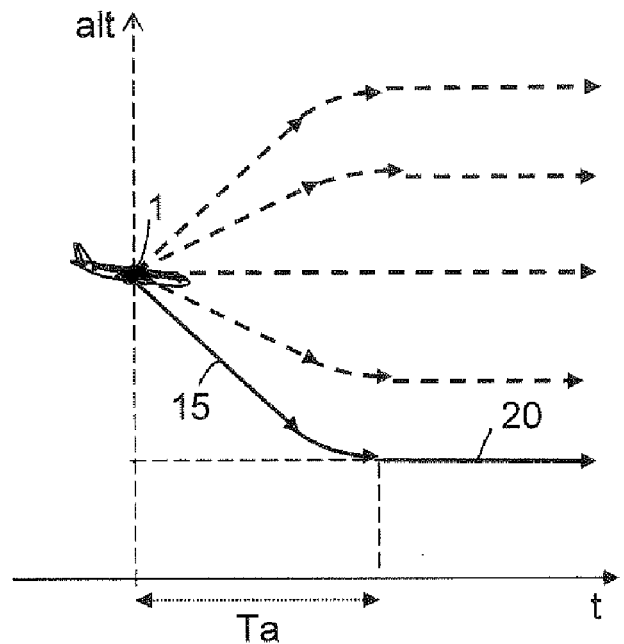

Curvilinear distance maps similar to that of FIG. 1 are created for the same overflight region but with vertical flight profiles corresponding to different vertical speeds. As shown in FIG. 4, to remain within the framework of a low-altitude flight where the positive or negative vertical speeds cannot be maintained for a very long time, these different vertical flight profiles have a first part 15 where the aircraft 1 adopts a certain vertical speed value for a so-called "anticipation delay" time Ta, followed by a second part 20 of level flight where the aircraft 1 adopts a zero vertical speed.

For the applications where a leveling off is not envisaged (engine failure, low-altitude flight, terrain hugging, etc.), the anticipation delay Ta can be very great, even infinite.

The adopted vertical flight profiles can be absolute vertical profiles defined from the current position of the aircraft and with vertical speed values independent of the current vertical speed of the aircraft, for example values of 500 ft/min, 1000 ft/min, etc. They can also be relative vertical profiles defined from the current position and the current vertical speed of the aircraft, the vertical speed values adopted at the time of their definitions being relative values related to the current vertical speed of the aircraft, for example 500 ft/min above the current vertical speed of the aircraft, 1000 ft/min above the current speed of the aircraft, etc.

The adopted vertical flight profiles are advantageously defined in increments of 500 ft/min, with an upper limit linked to the climb performance characteristics of the aircraft obtained by configuration or extracted from a performance database of the aircraft.

The different curvilinear distance maps generated for the overflight region represented and the different flight profiles corresponding to the different vertical speeds are then combined in a single map of the overflight region represented. This combining consists, for each point of the final map:
- in selecting, in each curvilinear distance map, the point geographically corresponding to the point concerned,
- choosing, from all the selected points, of which there are as many as there are curvilinear distance maps, the point assigned the lowest curvilinear distance estimation, with a preference, in case of several identical distance estimations, for the curvilinear distance map associated with the vertical flight profile having the highest vertical descent speed, and
- giving the chosen point an appearance that highlights the curvilinear distance map to which it belongs and therefore the vertical speed corresponding to the curvilinear distance map to which it belongs.

Figure 5:
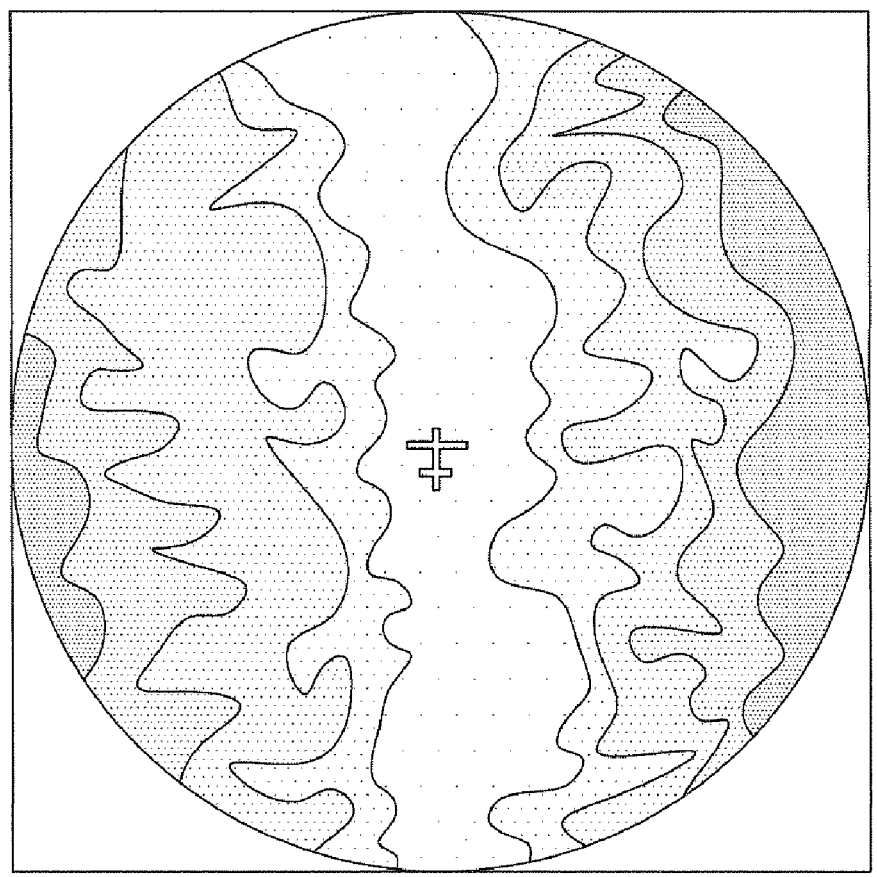
Figure 6:
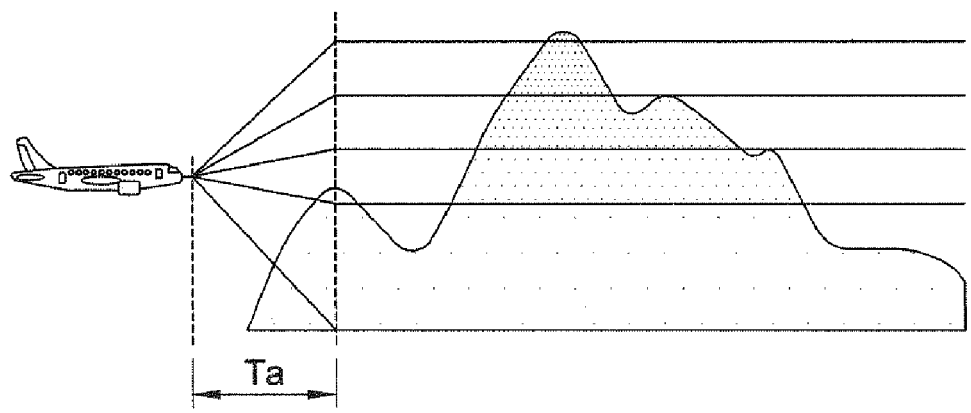

FIG. 5 shows the final map obtained, by combining four curvilinear distance maps generated over one and the same overflight zone for four vertical flight profiles corresponding, as shown on the vertical cross section of FIG. 6, to four vertical flight speed values. In these FIGS. 5 and 6, a particular texture representative of the vertical speeds associated with the vertical flight profiles corresponding to the curvilinear distance maps, is assigned to each curvilinear distance map and to their points retained in the final map.

The final map obtained is a visual support informing the air crew of the vertical speed constraints associated with flying over each point of its maneuver zone. It facilitates the low-altitude flight for the crew by informing the crew of changes of gradient needed along the path chosen for a safe flight over the relief.

When the anticipation delay Ta has a very high or infinite value, the final map indicates to the air crew the parts of its maneuver zone that can be reached for a set of given vertical speeds.

The final map can be used in combination with a ground collision risk map furnished by a ground collision risk prevention system of TAWS (Terrain Awareness and Warning System) type, to produce the same monitoring function with two different computation principles. Correlating the results makes it possible to reduce the probabilities of false warnings and missed warnings.

Figure 7:
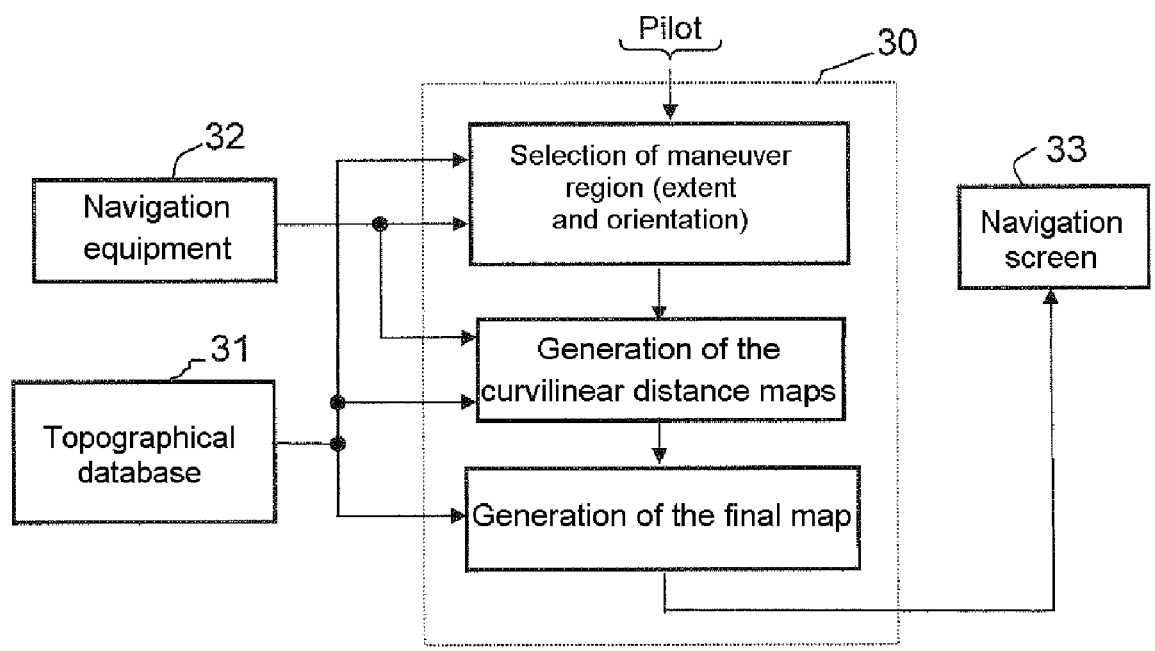

FIG. 7 shows a navigation aid device in its operational environment on board an aircraft. The navigation aid device mainly comprises a computer 30 associated with a database of terrain elevations and of prohibited overflight zones 31 and with a visual display device 33. The database of terrain elevations and of prohibited overflight zones 31 is represented as being on board the aircraft but it could equally be placed on the ground and accessible from the aircraft by radio transmission. The computer 30 can be a computer dedicated to generating and displaying a low-altitude navigation map showing the maneuver zone of the aircraft or a computer shared with other tasks such as flight management or the automatic pilot. From the navigation equipment 32 of the aircraft, it receives the main flight parameters including the position of the aircraft by latitude, longitude and altitude, and the direction and the amplitude of its speed vector which enable it to determine, at each instant, the position on the surface of the earth, the orientation and the dimensions of a maneuver zone to be displayed. Having the orientation and dimensions of the maneuver zone to be displayed, it extracts from the database of terrain elevations and prohibited overflight zones 31, a locating grid mapping the selected maneuver zone, and places on this grid the contours of the prohibited overflight zones. It then proceeds to generate different curvilinear distance maps corresponding to vertical flight profiles associated with different vertical speeds. Then it combines these curvilinear distance maps into a single final map showing the points of the maneuver zone to be displayed assigned false colors and/or different textures and/or symbols corresponding to vertical speed values needed to fly over them and displays this final map on a screen 33 of the cockpit, for example the navigation screen ND.

The invention claimed is:

1. A device for cartographically representing minimum vertical speeds for aircraft generating a navigation map from information in an elevation database of the terrain belonging to a particular maneuver region, comprising:

Curvilinear distance map generation means for generating, in the maneuver region, multiple curvilinear distance maps listing the lengths of the shortest paths leading from the current position of the aircraft to the various points of the maneuver region while observing vertical flight profiles associated with different vertical speeds for the aircraft, means for combining, on one and the same final map, all the curvilinear distance maps obtained, selecting, for each point of the final map, the point geographically corresponding to it in the different curvilinear distance maps assigned the lowest curvilinear distance estimation, and means of displaying the selected points, showing, for each selected point, the vertical speed associated with the vertical flight profile observed by its original curvilinear distance map.

2. The device as claimed in claim 1, wherein the curvilinear distance map generation means apply, for the generation of each curvilinear distance map, a propagation distance transform constrained to observe a determined vertical flight profile associated with a determined vertical speed value for the aircraft.

3. The device as claimed in claim 2, wherein the constrained propagation distance transform is a chamfer mask propagation distance transform.

4. The device as claimed in claim 1, wherein the curvilinear distance map generation means generates a curvilinear distance map observing a vertical flight profile in two parts: a first flight part from the current position of the aircraft with a fixed duration and a determined vertical speed value followed by a second horizontal flight part.

5. The device as claimed in claim 4, wherein the curvilinear distance map generation means generates a curvilinear distance map observing a vertical flight profile, the first part of which corresponds to a determined absolute vertical speed value independent of the current vertical speed of the aircraft.

6. The device as claimed in claim 4, wherein the curvilinear distance map generation means generates a curvilinear distance map observing a vertical flight profile, the first part of which corresponds to a determined vertical speed value linked to the current vertical speed of the aircraft.

7. The device as claimed in claim 1, wherein the curvilinear distance map generation means generate curvilinear distance maps observing vertical flight profiles associated with vertical flight speeds separated by an increment of 500 ft/min.

8. The device as claimed in claim 1, wherein the curvilinear distance map generation means generate curvilinear distance maps observing vertical flight profiles associated with vertical flight speeds separated by an increment of 500 ft/min with an upper limit linked to the climb performance characteristics of the aircraft.

\* \* \* \* \*